(12) United States Patent
Terui et al.

(10) Patent No.: US 9,036,965 B2
(45) Date of Patent: May 19, 2015

(54) MICROLENS ARRAY AND OPTICAL TRANSMISSION COMPONENT

(71) Applicants: Hiroshi Terui, Yokohama (JP); Fumihiro Ebisawa, Yokohama (JP); Shunichi Soma, Yokohama (JP); Akira Komiyama, Yokohama (JP); Keiichi Morita, Yokohama (JP); Fumito Nakajima, Musashino (JP); Yusuke Nasu, Musashino (JP)

(72) Inventors: Hiroshi Terui, Yokohama (JP); Fumihiro Ebisawa, Yokohama (JP); Shunichi Soma, Yokohama (JP); Akira Komiyama, Yokohama (JP); Keiichi Morita, Yokohama (JP); Fumito Nakajima, Musashino (JP); Yusuke Nasu, Musashino (JP)

(73) Assignees: NTT ELECTRONICS CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 275 days.

(21) Appl. No.: 13/666,692

(22) Filed: Nov. 1, 2012

(65) Prior Publication Data

US 2013/0108217 A1 May 2, 2013

(30) Foreign Application Priority Data

Nov. 2, 2011 (JP) .................................. 2011-241643

(51) Int. Cl.
| | | |
|---|---|---|
| G02B 6/32 | (2006.01) | |
| G02B 3/00 | (2006.01) | |
| G02B 6/36 | (2006.01) | |
| G02B 6/42 | (2006.01) | |

(52) U.S. Cl.
    CPC ............ G02B 3/0025 (2013.01); G02B 6/3636 (2013.01); G02B 6/423 (2013.01); G02B 3/005 (2013.01); G02B 6/4204 (2013.01)

(58) Field of Classification Search
    None
    See application file for complete search history.

(56) References Cited

U.S. PATENT DOCUMENTS 6,799,897 B2 * 10/2004 Sherrer ........................... 385/55
2003/0007740 A1 1/2003 Sherrer

FOREIGN PATENT DOCUMENTS

FR          2823859 A1    10/2002
(Continued)

OTHER PUBLICATIONS

Nakagawa, et al., "Lens-Coupled Laser Diode Module Integrated on Silicon Platform", Journal of Lightwave Technology, vol. 14, No. 6, Jun. 1, 1996, pp. 1519-1523.

(Continued)

*Primary Examiner* — Tina Wong
(74) *Attorney, Agent, or Firm* — Ohlandt Greeley Ruggiero & Perle L.L.P.

(57) ABSTRACT

A microlens array, which maintains high positional accuracy with respect to an optical circuit such as a waveguide and facilitates connection operation, and an optical transmission component including the microlens array.
Solution
The microlens array is provided with a plurality of microlenses arranged in an array structure and having the same length in the optical axis direction and optical fibers for alignment arranged at both ends of the array structure so that the optical axis is parallel to the optical axis of the microlens and having a length in the optical axis direction the same as the length of the microlens and a guided mode diameter smaller than an aperture of the microlens.

2 Claims, 8 Drawing Sheets

(56) References Cited

FOREIGN PATENT DOCUMENTS

| | | |
|---|---|---|
| JP | 07-218771 | 8/1995 |
| JP | 2007318750 | 12/1995 |
| JP | 2002174747 | 6/2002 |
| JP | 2008-040028 | 2/2008 |
| JP | 2011191647 | 9/2011 |

OTHER PUBLICATIONS

Extended European Search Report dated Feb. 1, 2013 for corresponding European Patent Application No. 12190350.4-2217 consisting of 7 pages.

Japanese Office Action dated Oct. 29, 2013 corresponding to Japanese Application No. 2011-241643; 5 pages.

\* cited by examiner

PRIOR ART

MICROLENS ARRAY AND OPTICAL TRANSMISSION COMPONENT

BACKGROUND

1. Field of the Disclosure

The present disclosure relates to a microlens array, which interconnects a planar lightwave circuit and array of optical semiconductor element such as a photodiode used in an optical communication field, and an optical transmission component including the microlens array.

2. Discussion of the Background Art

A gradient index (hereinafter referred to as GI) multimode optical fiber used in optical communication has a square refractive index distribution in which the refractive index is maximum at the core center and exhibits a good lens function when the optical fiber is used as not only an optical transmission path as a primary role but a microlens. Thus, the optical fiber is used for optical coupling between an optical circuit and an optical semiconductor element such as a photodiode (hereinafter referred to as PD).

Figure 1:
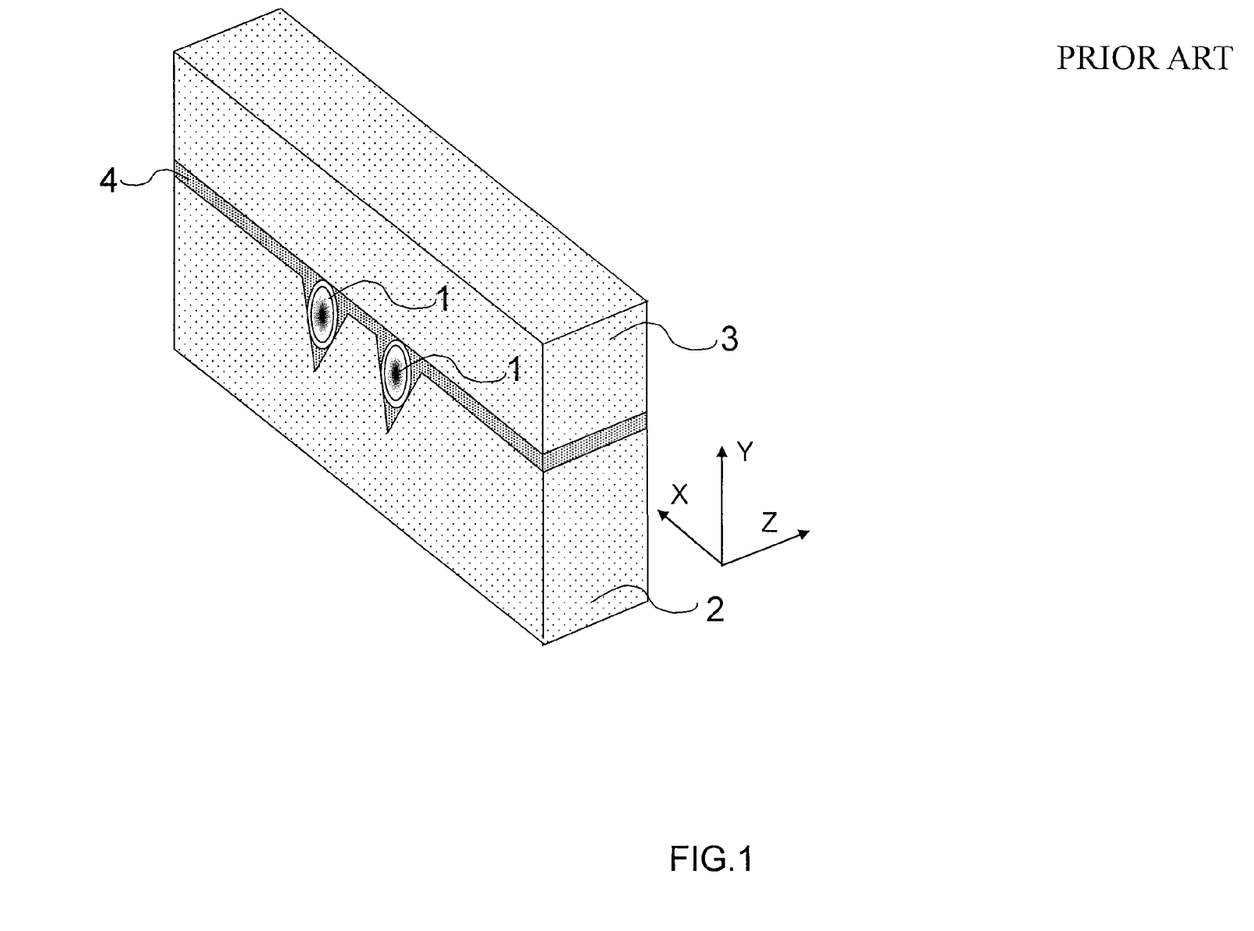
FIG. 1 is a perspective view of a conventional microlens array.

FIG. 1 is an example of a conventional type of microlens array used for such an object (for example, see Patent Document 1). In FIG. 1, two arrays of microlenses 1 constituted of a GI fiber and having an optical axis in the Z-axis direction are interposed between a V-shaped groove plate 2 and a top plate 3 so as to be arranged along an array axis parallel to a X axis and are fixed with an adhesive 4. Although the Z direction length of the microlens 1 is different depending on desired light collecting position and light collecting diameter, it is usually approximately 0.3 to 1 mm.

Patent Document 1 Japanese Patent Application Laid-Open No. 2008-040028

SUMMARY

Figure 2:
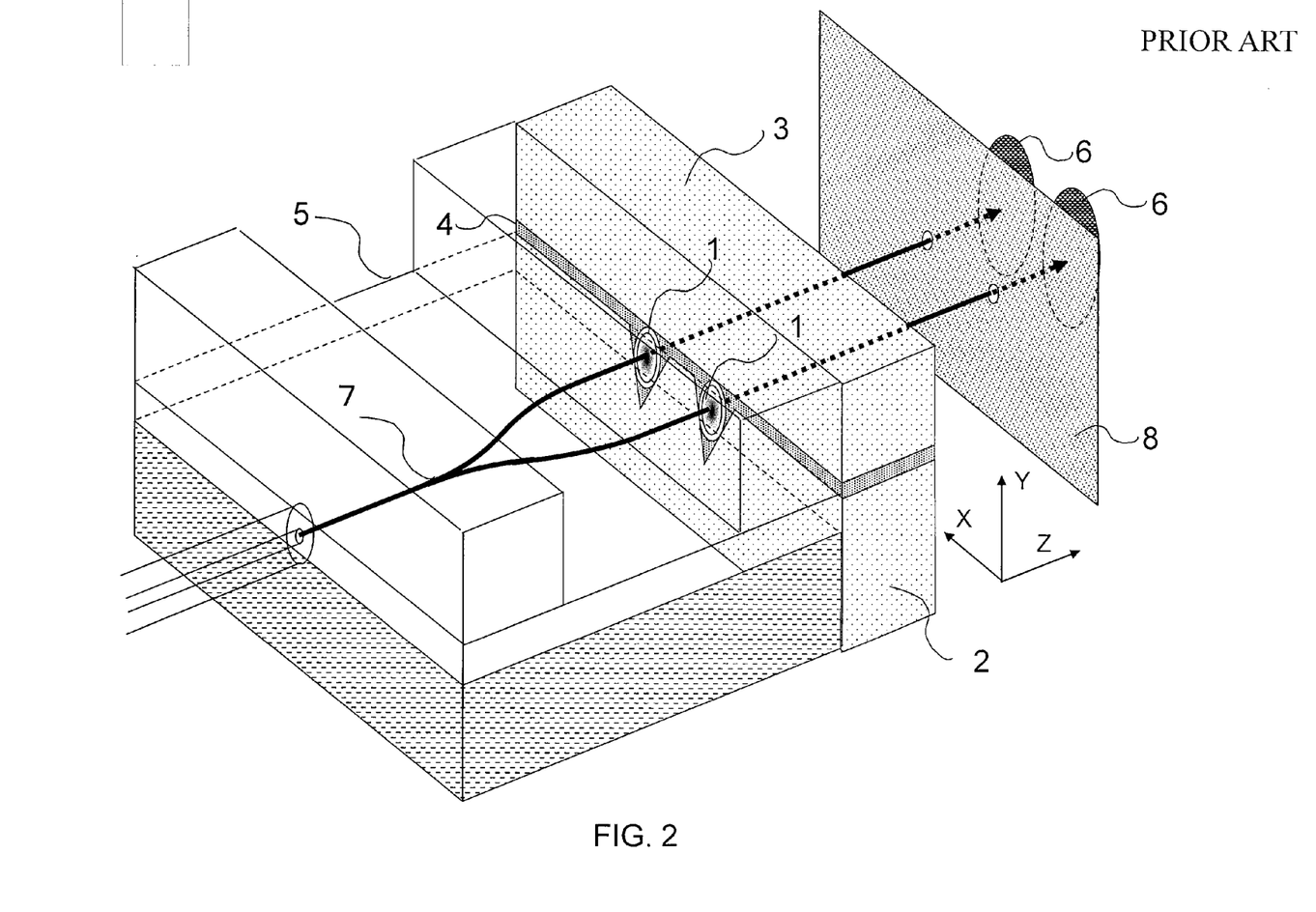
FIG. 2 is a perspective view showing connection operation between the conventional microlens array and an optical circuit.

It will be considered that the microlens array having the two arrays shown in FIG. 1 is connected to two branching sides of the 1×2 branch optical circuit 5, as shown in FIG. 2. A branching side waveguide interval is set to be the same as the array interval of the microlens array. The optical circuit 5 is constituted of an optical waveguide 7 provided on a substrate and constituted of a core and a clad and protector boards provided at the both ends and used for facilitating the connection of a fiber and other components. In the connection and fixing of the microlens array, an optical fiber and other components are previously connected to an optical circuit end on one input side to pass guided light, and, thus, to fix the microlens array at a position of the maximum light-receiving intensity while monitoring output light from the microlens 1 with a monitor PD 6. Here, there are the following problems.

Figure 3A:
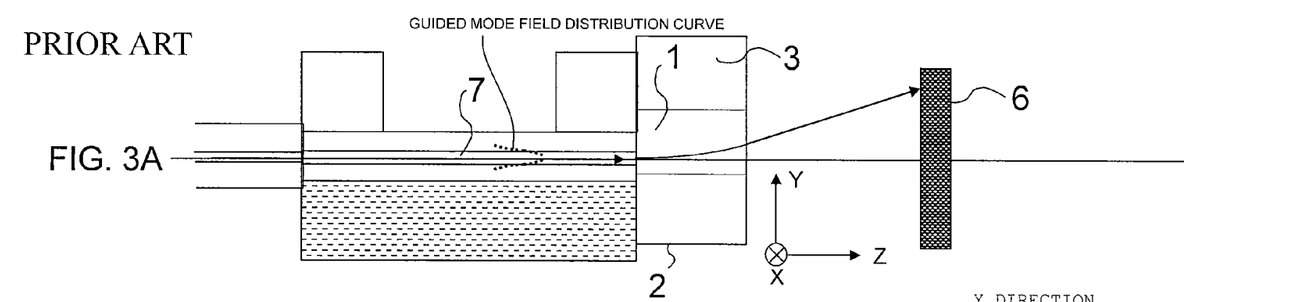
FIG. 3A is a view when a waveguide is shifted from a lens optical axis.
Figure 3B:
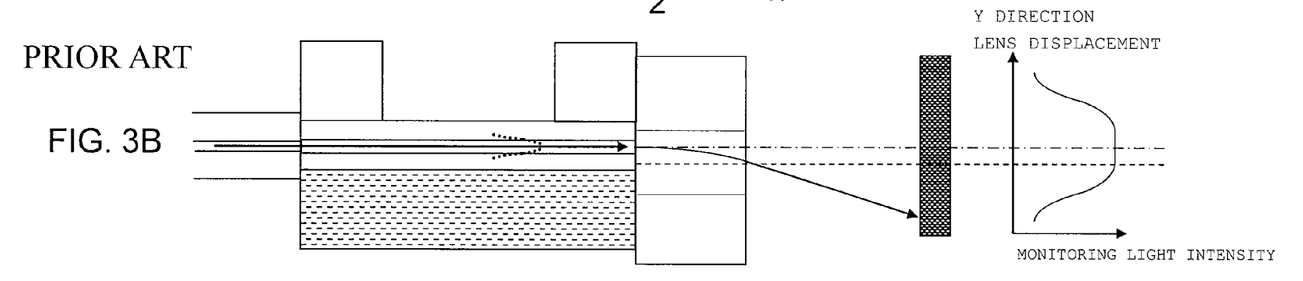
FIG. 3B is a view when the waveguide is shifted from the lens optical axis.

FIG. 3 is a view of the aligned state as viewed in the X direction. In the alignment and fixing, in order to maximize lens performance such as a light-collecting capability, the center of guided mode field distribution propagating in the optical waveguide 7 and the center position of the microlens 1 should be coincided with each other. Usually, while the guided mode diameter of the optical waveguide 7 is 10 μm or less, the aperture of the microlens 1 is large such as 50 μm or more, and therefore, even if the lens center is shifted from the center of the guided mode, light emitted from the microlens 1 reaches a light receiving surface of the monitor PD 6 without being attenuated and diffused, and a monitoring light quantity hardly changes from the optical axis in the radial direction, as shown in FIGS. 3A and 3B. Namely, a position-monitoring light intensity curve shown in a duplex manner at the right end in FIG. 3B is in a trapezoidal shape, and the lens center position coinciding with the waveguide center is not obtained with sufficient accuracy. The guided mode diameter is a diameter at which the light intensity changes from the peak to $1/e^2$ in a guided mode field distribution curve shown in FIG. 3.

Figure 3C:
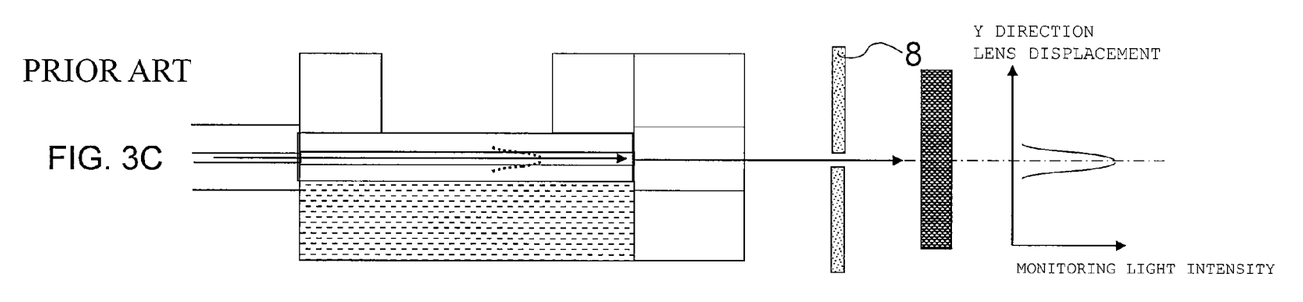
FIG. 3C is a view for explaining operation of aligning the waveguide and the lens optical axis with the use of a slit.

As a method for solving the above problems, as shown in FIG. 3C, a slit 8 with a hole diameter comparable to a guided mode diameter of the optical waveguide 7 is placed in front of the monitor PD 6. According to this constitution, as shown in FIG. 3C, the position-monitoring light intensity curve has a peak at a position where the guided mode propagating in the optical waveguide 7 and the center of the microlens 1 coincide with each other, thereby allowing positional alignment.

However, in the above method, it is necessary to perform setting with sufficient positional accuracy in advance in order to align the positional relationship between the slit 8 and the optical waveguide 7 on a X-Y surface in the drawing so that the light emitted from the microlens 1 passes through the slit 8 once the guided mode center and the center of the microlens 1 coincide with each other. Thus, the above method has a problem that a lens mounting operation is complex, including provision of a dedicated device specifically for an optical circuit-lens connection process and it is difficult to reduce cost.

Thus, in order to solve the above problem, this disclosure provides a microlens array which maintains high positional accuracy with respect to an optical circuit such as a waveguide and facilitates connection operation, and an optical transmission component including the microlens array.

Means for Solving the Problems

In order to achieve the above problem, in the microlens array according to the present disclosure, optical fibers for alignment are arranged at both ends of microlenses arranged in an array.

More specifically, the microlens array according to the present disclosure is provided with a plurality of microlenses arranged in an array structure and having the same length in an optical axis direction and optical fibers for alignment arranged at both ends of the array structure so that the optical axis is parallel to the optical axis of the microlens and having a length in the optical axis direction the same as the length of the microlens and a guided mode diameter smaller than the aperture of the microlens.

The intensity of light emitted from a fiber for alignment easily changes in the radial direction from the optical axis. Thus, even if a slit with a hole diameter comparable to the guided mode diameter of an optical waveguide is not used, the respective guide mode centers of the fiber for alignment and the waveguide such as an optical circuit can be coincided with each other with high accuracy. When a waveguide for alignment is formed in an optical circuit connecting to the microlens so as to be in parallel with a waveguide for a signal, the positional alignment between the waveguide for alignment and the fiber for alignment of the microlens array of this disclosure can be easily performed, and the microlens and the waveguide can be connected with high accuracy.

Accordingly, the present disclosure can provide a microlens array which maintains high positional accuracy with respect to an optical circuit such as a waveguide and facilitates connection operation.

The microlens of the microlens array according to the present disclosure is a multimode refractive index distribution type of optical fiber, and the optical fiber for alignment is a single-mode optical fiber.

A guided mode diameter of the optical fiber for alignment can be rendered sufficiently smaller than the aperture of the microlens, and the accuracy of positional alignment can be enhanced.

An optical transmission component according to the present disclosure has the microlens array, an optical waveguide optically connected to the microlens, and an optical circuit provided with an optical waveguide for alignment optically connected to a core of the optical fiber for alignment.

In the optical circuit, a waveguide for alignment is formed so as to be in parallel with a waveguide for a signal. Since positional alignment between the waveguide for alignment and the fiber for alignment of the microlens array can be easily performed, the microlens and the waveguide of the optical circuit can be easily connected with high accuracy.

Accordingly, the present disclosure can provide an optical transmission component easily manufactured while securing high connection accuracy between the optical circuit such as a waveguide and the microlens array.

The present disclosure can provide a microlens array which maintains high positional accuracy with respect to an optical circuit such as a waveguide and facilitates connection operation, and an optical transmission component including the microlens array.

BRIEF DESCRIPTION OF THE DRAWINGS

FIG. 3 is a cross sectional view showing the connection operation between the conventional microlens array and the optical circuit.

DETAILED DESCRIPTION OF THE PREFERRED EMBODIMENT

An embodiment of the present disclosure will be described with reference to the accompanying drawings. The embodiment to be described hereinafter is an example of the present disclosure, and the present disclosure is not limited to the following embodiment.

Figure 4:
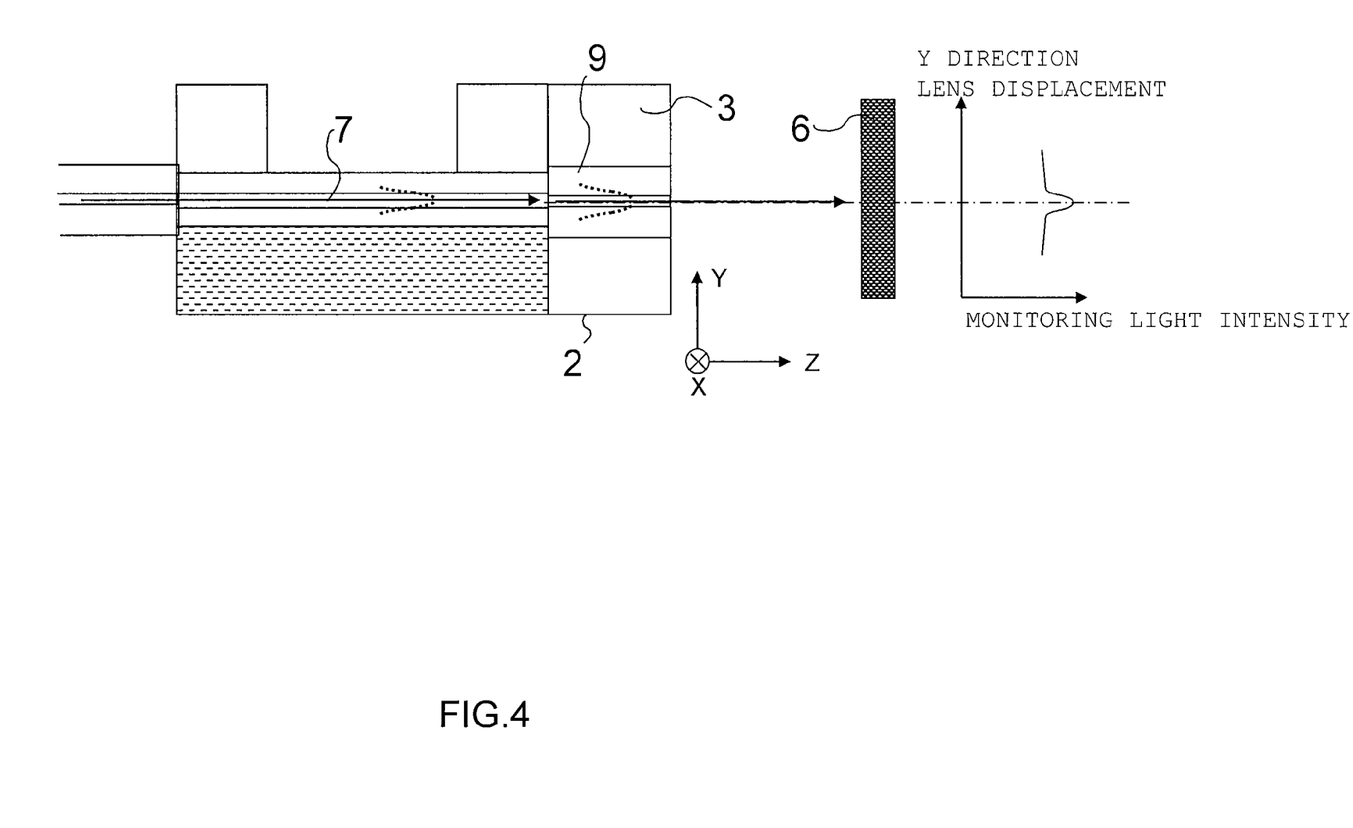
FIG. 4 is a cross sectional view showing the connection operation between a microlens array according to the present disclosure and the optical circuit.

In constitution shown in FIG. 3, a microlens 1 is replaced with an optical fiber for alignment 9 as a single-mode optical fiber having a guided mode diameter comparable to an optical waveguide 7, and the constitution shown in FIG. 4 is provided. In this case, in a position where light is received by the monitor PD 6-monitoring light intensity curve, as schematically shown in the drawing, the optical fiber for alignment 9 is short such as 1 mm or less at most, and therefore, background light intensity is high. However, the position-monitoring light intensity curve is a peak curve that is maximum when the guided mode center of the optical fiber for alignment 9 coincides with the guided mode center of the optical waveguide 7. Thus, the above problems will be solved as follows.

A microlens array of the present embodiment is provided with the plurality of microlenses 1 arranged in an array structure and having the same length in the optical axis direction and the optical fiber for alignments 9 arranged at both ends of the array structure so that the optical axis is parallel to the optical axis of the microlens 1 and having a length in the optical axis direction the same as the length of the microlens 1 and a guided mode diameter smaller than the aperture of the microlens 1.

The microlens 1 is a multimode refractive index distribution type of optical fiber, and the optical fiber for alignment 9 is a single-mode optical fiber.

Figure 5:
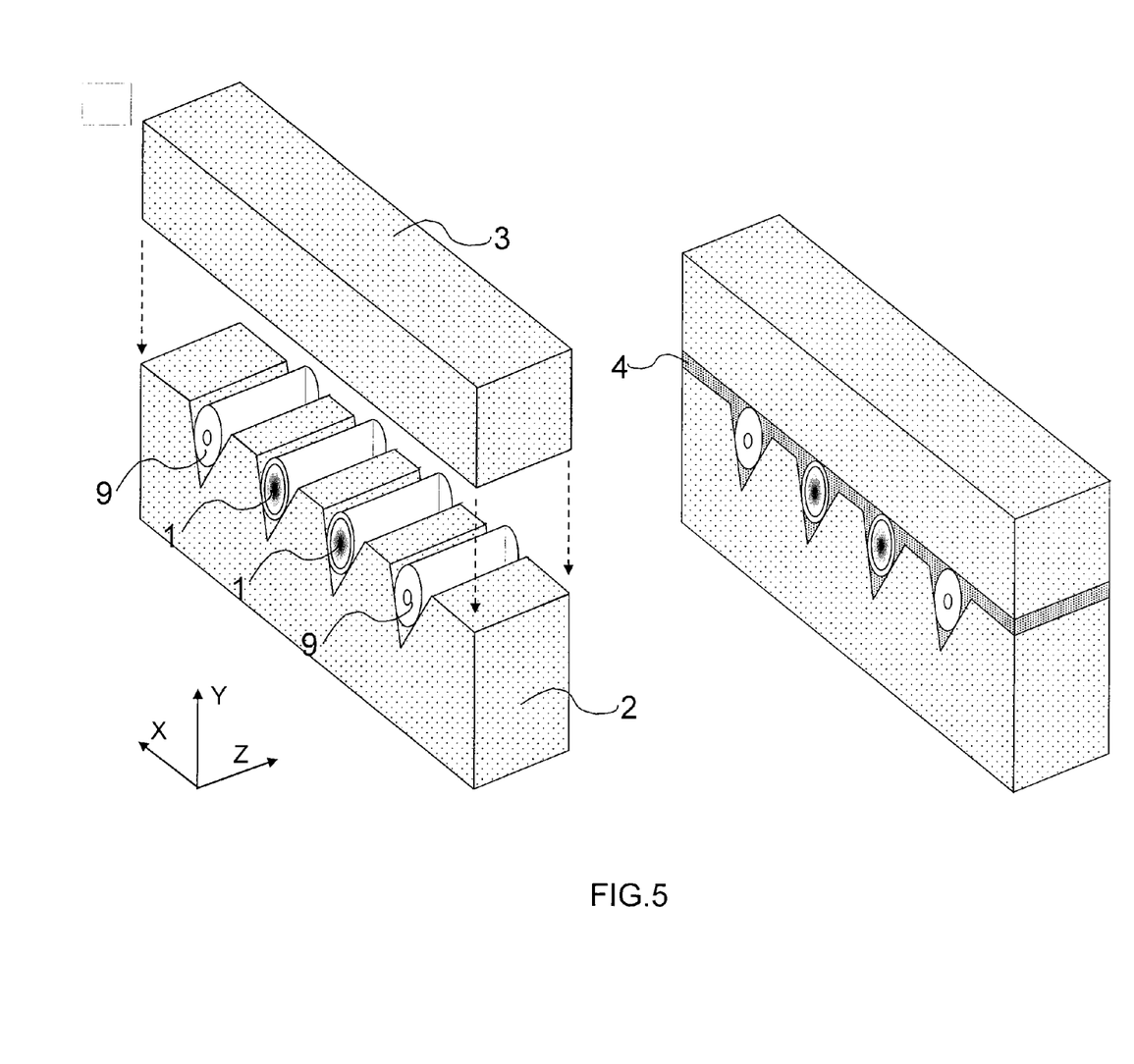
FIG. 5 is a perspective view of the microlens array according to the present disclosure.

FIG. 5 shows a perspective view of the microlens array of the present embodiment. The microlens array has two arrays of the microlenses 1 constituted of a GI fiber and the optical fiber for alignments 9 provided on the sides of the two arrays, having a clad diameter the same as the GI fiber, and constituted of a single-mode optical fiber having a guided mode diameter comparable to the guided mode diameter of the optical waveguide 7. When a line parallel to the X axis is an array axis, the microlens array further has a V-shaped groove plate 2 in which four parallel V-shaped grooves having the same shape are formed in the Z-axis direction perpendicular to the array axis and a top plate 3. The microlens array has a structure in which the microlenses 1 and the optical fiber for alignments 9 are interposed between the V-shaped groove plate 2 and the top plate 3 and fixed with an adhesive 4.

The interval of the microlenses 1 is matched with a waveguide interval of an optical circuit to be connected. The microlens array of this embodiment is different from the conventional one shown in FIG. 1 in that the two optical fibers for alignments 9 are provided on the both sides of the array structure of the microlens 1. Since the microlens 1 and the optical fiber for alignment 9 have the same clad diameter, the respective centers of the microlens 1 and the optical fiber for alignment 9 are automatically aligned on a straight line.

Figure 6:
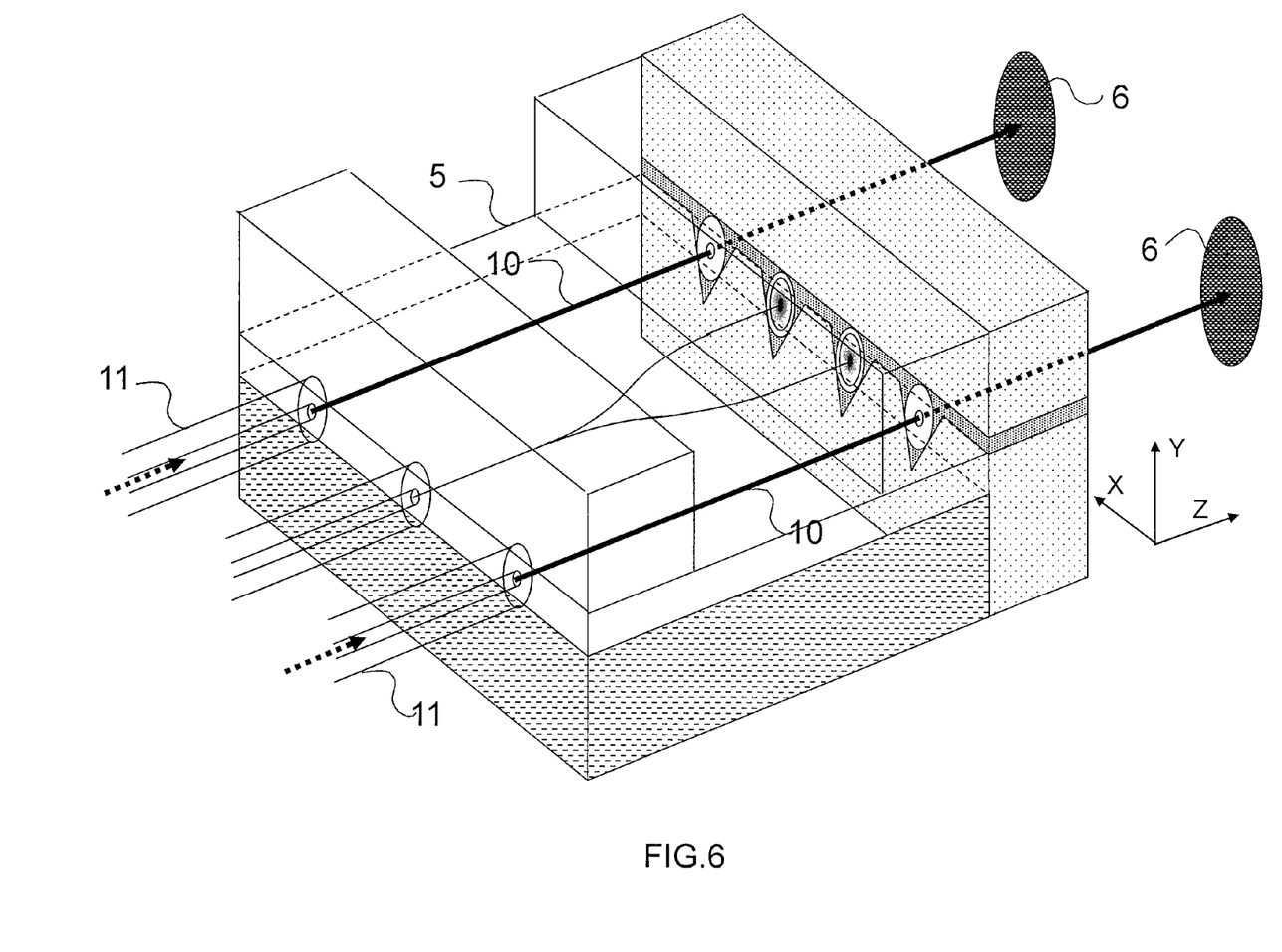
FIG. 6 is a perspective view showing the connection operation between the microlens array according to the present disclosure and the optical circuit.

As another different point, as shown in FIG. 6 as an application view of the microlens array, an optical circuit 5 is provided with waveguides 10 for alignment and optical fibers 11, connected to the waveguide for alignments 10, according to the two optical fiber for alignments 9.

In alignment and fixing of the microlens array to the optical circuit 5, monitoring light from the waveguide for alignment 10 is received by the monitor PD 6. The position-monitoring light intensity curve has a peak as shown in FIG. 4 shown above, and an alignment operation between the waveguide for alignments 10 and the optical fiber for alignments 9 installed at the both ends of the array structure allows biaxially aligned fixing of the optical circuit 5 and the microlens array.

It is assumed that the clad diameter of the GI fiber used as the microlens 1 and the clad diameter of the optical fiber for alignment 9 are different from each other. In this case, in the V-shaped groove plate 2, the depths of the V-shaped grooves corresponding to the microlens 1 and the optical fiber for alignment 9 are made different from each other, and the respective centers of the microlens 1 and the optical fiber for alignment 9 may be aligned in a straight line. The top plate 3 is provided with not only the V-shaped groove plate but a protrusion or a recess, whereby the microlens 1 and the optical fiber for alignment may be pressed and fixed.

Hereinafter, an example will be described. In this example, it is assumed that an operating wavelength is 1.55 μm.

As the optical circuit 5, a silica based planar lightwave circuit with NA of 0.21 and a guided mode diameter of 7 μm is used. As the microlens 1, a GI type optical fiber with NA of 0.28, a core diameter of 62.5 μm (that is, a lens aperture of 62.5 μm), and a clad diameter of 125 μm is used. As the optical fiber for alignments 9 to be arranged on the both sides, single-mode optical fibers with NA of 0.14, a guided mode diameter of 9.2 μm, and a clad diameter of 125 μm are used. Those components are configured into a fiber block constituted of a 60 degree V-shaped groove plate 2 formed of Pyrex (trademark) glass and cut at intervals of 250 μm, the adhesive 4, and the top plate 3 formed from a Pyrex (trademark) glass flat plate as in the V-shaped groove plate 2, and thereafter, the fiber block is cut into 0.411 mm length to obtain a microlens array with an interval of 250 μm.

Figure 7:
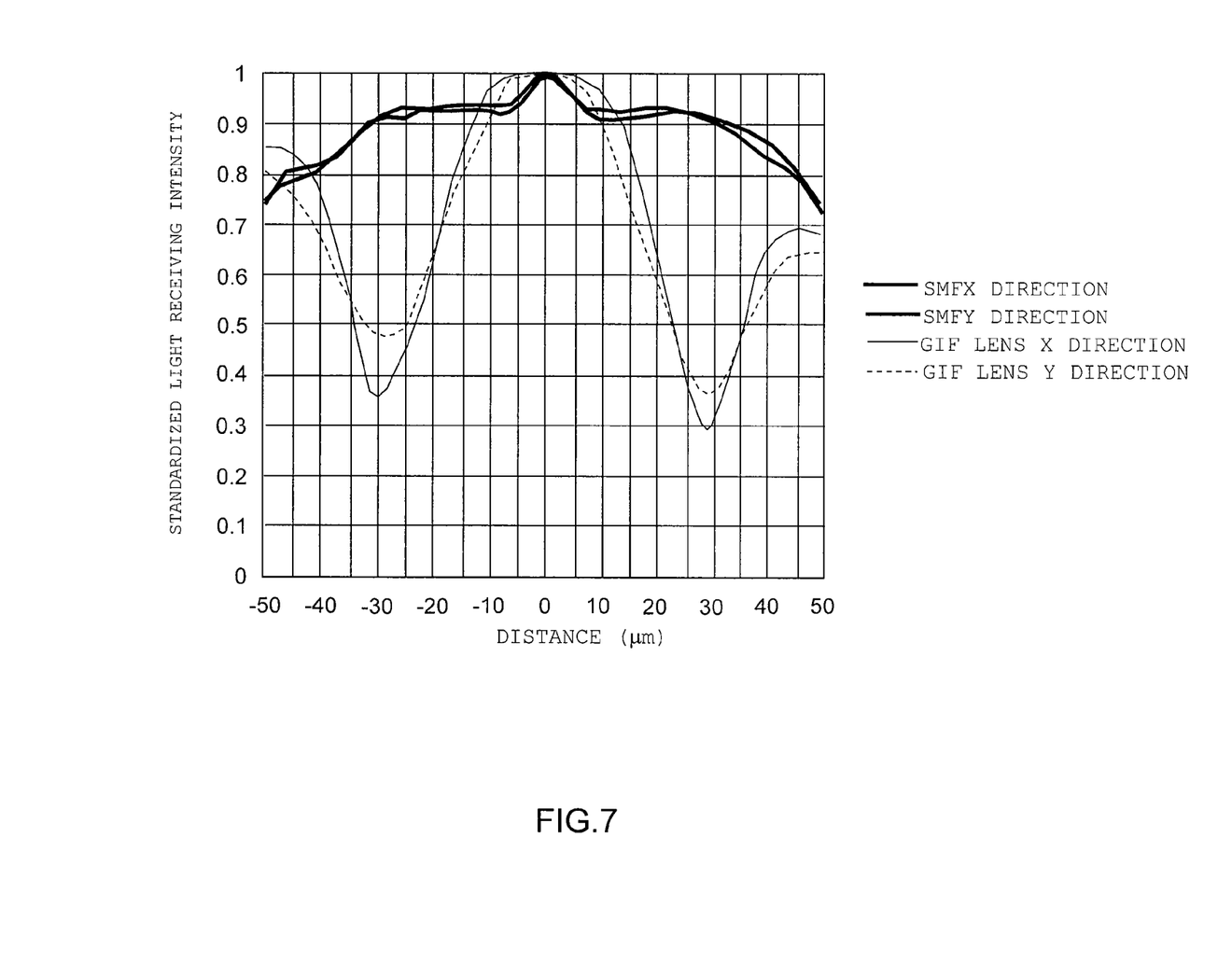
FIG. 7 is a comparative graph of a position-monitoring light intensity curve of an optical waveguide and a microlens.
Figure 8:
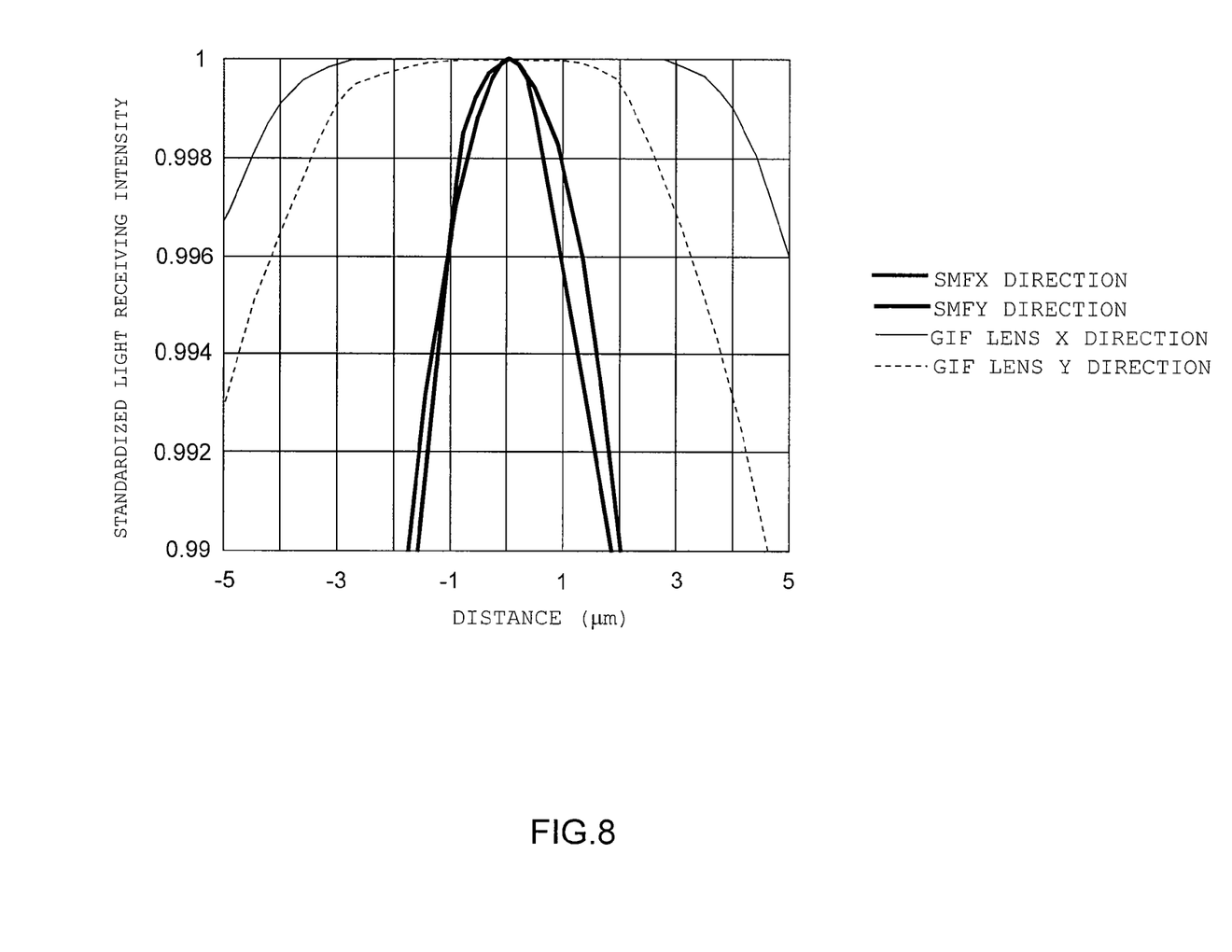
FIG. 8 is an enlarged comparative graph near an optimum alignment position of the position-monitoring intensity curve of the optical waveguide and the microlens.

The position-monitoring light intensity curve at the time of the alignment operation of the microlens array with the optical fiber for alignments to the optical circuit 5 is shown in FIGS. 7 and 8. The light receiving diameter of the monitor PD 6 used in this example is 10 mmφ. In those drawings, a case according to a conventional method in which alignment is performed by the microlens 1 (GIF in the drawings) itself (without using the slit 8) and a case where the optical fiber for alignment 9 (SMF in the drawings) of the present disclosure is used are shown for comparison. FIG. 7 shows the position-monitoring light intensity curve in a range of ±50 μm when a point at which the waveguide core of the optical circuit 5 and the center of the microlens 1 substantially coincide with each other is the center. Since the waveguide core and the optical fiber for alignment 9 are significantly positionally deviated in a range of ±10 μm or more, the monitor PD 6 receives, as background light, light passing through a clad of the optical fiber for alignment 9, and the background light intensity is stronger than that in the GI lens. Meanwhile, in a range of ±10 μm or less, it can be shown that a peak sharper than that of the GI lens transmitted light is shown. FIG. 8 is an enlarged graph of the range of ±5 μm. As seen in the drawing, in the GI lens, the position-monitoring light intensity curve is constant in a region of ±3 μm in the X direction and ±2 μm in the Y direction, and the peak cannot be distinguished with further accuracy. Meanwhile, in the alignment using a single mode optical fiber as the optical fiber for alignment 9, the peak is clear, and an alignment optimum position can be distinguished with accuracy of sub μm.

In the present embodiment, although the array structure of the microlens is the two array structure, the array structure is not limited thereto. Moreover, the optical fiber for alignment is not limited to the single mode optical fiber and may be a multimode optical fiber. In any of the optical fibers, the condition is that the guided mode diameter is smaller than the aperture of the microlens. The term "smaller" means that the guided mode diameter of the optical fiber for alignment is more than 0 and less than the aperture of the microlens. Regarding the alignment accuracy, the maximum accuracy is obtained when the guided mode diameter of the optical waveguide 7 and the guided mode diameter of the optical fiber for alignment 9 coincide with each other. This is because optical coupling between the optical waveguide 7 and the optical fiber for alignment 9 is maximum in this case, the background light is minimum to obtain the sharpest alignment peak curve, and peak distinction with a low S/N ratio can be performed.

Effect of Embodiment

As described above, according to the present embodiment, the following effects can be expected.

First, in the present embodiment, the optical fiber for alignments 9 are provided on the both sides of the array of the microlens 1, and the corresponding optical fibers 11 are provided on the input side of the optical circuit. However, the outer diameter accuracy of the optical fiber 11 is held within ±1 μm; moreover, the cost of the optical fiber is low, and a multi-array technique in a fiber block manufacture technique utilizing a V-shaped groove progresses. Thus, there is no technical difficulty.

Although the waveguide for alignment 10 is required to be provided in the optical circuit 5, the waveguide for alignment 10 is just used for the alignment operation, and the waveguide for alignment 10 is just provided on a photomask at the stage of designing regardless of the quality of the waveguide itself.

Accordingly, application of this structure has an extremely small impact on the increase in cost.

Next, further advantages of the present embodiment will be described.

As the first advantage, the biaxial alignment process may be entirely the same as usual waveguide connection. With the aid of a familiar optical fiber array manufacturing technique, the optical fiber for alignment is used in place of the operation of the slit 8 requiring high positional accuracy, and a conventional waveguide connection device can be used as it without enhancing the functions at all.

As the second advantage, the microlens array can be connected to highly-functional optical circuits utilizing an electro-optic effect, a thermo-optic effect, and so on without operating these circuits. The highly-functional circuit is often set to be normally off, and in the prior art, the circuit is required to be driven at the time of connection operation in order to obtain monitoring light. In this embodiment, since the waveguide for alignment is used, such a driving device is not required.

As described above, in the present disclosure, the microlens array can be mounted on the optical circuit with high accuracy, it is effective for connecting an optical circuit and an ultrahigh-speed photodiode with a narrow light receiving diameter of 20 μm or less aiming at a band of 20 GHz or more predicted that there is a growing demand with more and more increase in capacity of optical communication in the future.

EXPLANATION OF REFERENCE NUMERAL

1: Microlens
2: V-shaped groove plate
3: Top plate
4: Adhesive
5: Optical circuit
6: Monitor PD
7: Light waveguide
8: Slit
9: Optical fiber for alignment
10: Waveguide for alignment
11: Optical fiber

What is claimed is:
1. A microlens array comprising:
a plurality of microlenses arranged in an array structure and having the same length in the optical axis direction; and
optical fibers for alignment arranged at both ends of the array structure so that the optical axis is parallel to the optical axis of the microlens and having a length in the optical axis direction the same as the length of the microlens and a guided mode diameter smaller than an aperture of the microlens, wherein the microlens is a multimode refractive index distribution type of optical fiber, and the optical fiber for alignment is a single-mode optical fiber.

2. An optical transmission component comprising:

the microlens array according to claim 1; and an optical circuit comprising a light waveguide optically connected to the microlens and a light waveguide for alignment optically connected to a core of the optical fiber for alignment.

* * * * *